United States Patent Office 3,296,008
Patented Jan. 3, 1967

3,296,008
PHTHALOCYANINE PIGMENTS
André Pugin, Riehen, near Basel, Switzerland, assignor to J. R. Geigy A.-G., Basel, Switzerland
No Drawing. Filed Feb. 26, 1963, Ser. No. 261,214
Claims priority, application Switzerland, Mar. 2, 1962, 2,556/62
7 Claims. (Cl. 106—288)

The present invention relates to a method of stabilizing finely crystalline metal-free phthalocyanine of β-form, to the stabilized metal-free β-phthalocyanine, the use thereof for pigmenting organic materials and, as an industrial product, the material pigmented therewith.

In this instance, there is to be understood by "finely" or "microcrystalline" an average crystal size of one μ at the maximum.

It would be desirable to use the β-form of metal-free phthalocyanine as a pigment on account of its outstanding greenish-blue shade. However, known microcrystalline products of β-form metal-free phthalocyanine, which were prepared by grinding crude phthalocyanine in the presence of organic solvents and salts, while possessing the desired shade and good color strength, are not stable to aromatic solvents, which are present in most lacquers, varnishes and printing inks in which the pigment is to be incorporated.

While it is known that metal-free phthalocyanine of the α- or of the γ-form may be converted into a form which is stable to organic solvents, by mixing the metal-free phthalocyanine with metal-containing or metal-free chloro- or nitro-containing phthalocyanine and by dissolving these mixtures in concentrated sulphuric acid and reprecipitating them therefrom, no process is known to stabilize the β-form metal-free phthalocyanine. Microcrystalline α-forms of the metal-containing or the metal-free phthalocyanine, which have good color strength may be produced by grinding crude phthalocyanine with salts in the absence of organic solvents, but are also unstable in aromatic solvents, even when additions of chloro- or nitro-containing metal-phthalocyanines to the α-form metal-free phthalocyanine are made prior to grinding.

Furthermore, compositions containing a microcrystalline β-form of the metal-free phthalocyanine, which have good color strength, can be produced by grinding crude metal-free phthalocyanine with an addition of unhalogenated β-form copper phthalocyanine in the presence of organic solvents and salts; however, although the β-form of the halogen-free copper phthalocyanine, which has itself good color strength, is stable in aromatic solvents, the aforesaid microcrystalline halogen-free mixtures of β-form metal-free phthalocyanine and β-form copper phthalocyanine are not stable.

Mixtures of β-form metal-free phthalocyanine with the unstable α-form halogen-free copper phthalocyanine are, of course, themselves unstable.

It has now been found that, contrary to what would have been expected from the foregoing, finely crystalline metal-free phthalocyanine of the β-form can be stabilized by intimately mixing it with a finely crystalline α-form metal-phthalocyanine containing 1 to 4 halogen atoms per molecule wherein the metal has an atomic number between 27 and 29 inclusive, which stabilizing metal phthalocyanine may also contain an admixture of non-halogenated metal phthalocyanine, without losing its stabilizing effect.

It is noteworthy that the α-form of the metal-free phthalocyanine cannot be stabilized under the aforesaid conditions, and particularly unexpected that the stabilization of the β-form metal-free phthalocyanine is achieved with the aid of a stabilizing agent which is itself in the α-form.

The α-form halogenated metal phthalocyanines which are used for stabilizing, contain cobalt, nickel or, preferably copper as metal, and fluorine, bromine and/or preferably chlorine as halogens. The halogenated metal phthalocyanines contain from 1 to 4 atoms of halogen per molecule and the atoms of halogen may be present in one, two, three or in all four benzene rings of the metal phthalocyanine molecule. Higher degrees of halogenation affect the desired stabilization adversely.

The halogenated metal phthalocyanines are obtained by known methods, for example, by mild halogenation of metal phthalocyanines, by reacting 1 mole of a metal-halogenide with 4 moles of o-phthalic acid dinitrile or by reacting one mole of a mono-, di-, tri- or tetrahalogeno-o-phthalic acid anhydride with 3 moles of phthalic acid anhydride or by reacting a total of 4 moles of a mixture consisting of 1 to 4 moles of monohalogeno-o-phthalic acid anhydride and 3 to 0 moles of o-phthalic acid anhydride with a metal salt and urea in the presence of ammonium-molybdate in a high boiling organic solvent. The preferred stabilizing halogenated metal phthalocyanine is monochlorocopperphthalocyanine because of its availability, its low price and the cleanness of its shade.

The halogenated metalphthalocyanines may be used alone as stabilizing compound, but their stabilizing effect is so high that it is possible to mix them with non-halogenated metal phthalocyanines without loss of their stabilizing effect, as long as the amount of halogenated metal phthalocyanine in the stabilizing agents is such that the halogen content of the agent is at least 2% by weight and the amount of stabilizing agent added to the β-form metal-free phthalocyanines to be stabilized is such that the content of halogen in the resulting mixture is at least 0.08% by weight. The preferred composite stabilizing agent of halogenated metal phthalocyanines with non-halogenated metal phthalocyanines are mixtures of monochlorocopper-naphthalocyanine with copperphthalocyanine which contain 2.5–5% by weight of chlorine calculated on the total weight of the stabilizing mixture. The necessary amount of the stabilizing compound is, therefore, very low.

More particularly, it has been found that a notable improvement of the stability to aromatic solvents of the metal-free β-phthalocyanine is obtained with the addition of amounts of 4% by weight, calculated on the total weight of the resulting stabilized product of a stabilizing mixture of copperphthalocyanine and monochlorocopper-phthalocyanine which in turn contains 2 to 4% of chlorine calculated on the weight of the last-mentioned stabilizing mixture. Optimal solvent stability is obtained with a content of approximately 10% of stabilizing, partly halogenated copperphthalocyanine mixture which contains in turn 3–5% chlorine.

The resulting pigment has approximately the same shade as the pure metal-free β-phthalocyanine but in contrast to the latter is stable in aromatic solvents.

By adding even higher amounts than 10% of the composite stabilizing agent, the greenish blue shade of the metal-free β-phthalocyanine is shifted more toward blue. If 30–45% of a stabilizing mixture of copperphthalocyanine and monochlorocopperphthalocyanine which contains 3–5% chlorine is mixed with 70–55% metal-free phthalocyanine, then a blue pigment is obtained which is very similar in shade to the metalfree α-phthalocyanine, but in contrast to the latter is stable in aromatic solvents. This stabilized pigment is very valuable, because its shade corresponds approximately to the Blue standard value of the German "DIN-Norman No. 16508–16509" for trichromatic printing.

The addition of a still greater portion of the last-mentioned stabilizing mixture changes the shade of the resulting product still further towards reddish-blue without adversely affecting the resistance of the product to aromatic solvents.

As compared with the known methods of stabilizing metal-free phthalocyanine of the α-form, the method according to the invention offers the advantage that the treatment to be effected with sulphuric acid, which is known to exert a strongly oxidizing effect on the metal-free phthalocyanine, can be omitted. Furthermore this method renders it possible not only to produce stabilized pigments of a much greener shade than is possible with the α-form, but also, by means of the above-described suitable combination of metal-free phthalocyanine of the β-form with the stabilizing material, to produce pigments of the β-form which have the same shade as those of the α-form.

The mixing of the metal-free phthalocyanine of the β-form with the stabilizing agent is carried out in different ways. It is important that a complete mixture is made before the finished pigment is brought into contact with aromatic solvents; otherwise no stabilization is achieved. For example, both components can be finely ground separately and thereafter singly mixed. However, it is preferable to grind crude metal-free phthalocyanine and crude stabilizing agent together in the presence of organic solvents and, if desired, in the presence of salts which are suitable as grinding assistants.

Hydrocarbons for example, in particular those of the aromatic series, such as toluene, xylene and also naphthalene, and also the petroleum fraction with a boiling range of between 150–250°, furthermore halogenated hydrocarbons, such as chlorobenzene, chloronaphthalene, carbontetrachloride, tetrachloroethane or nitrated hydrocarbons, for example nitrobenzene or dinitrobenzene, and also aromatic and heterocyclic amines, such as dimethyl- or diethylaniline, methylpyridine or quinoline, ketones, such as acetophenone, or aldehydes for example benzaldehyde, may be employed as solvents.

Examples of salts which are suitable as grinding assistants are: sodium chloride, -sulphate, -carbonate or -acetate, furthermore potassium ferrocyanide, calcium carbonate and preferably calcium chloride. Apart from these inorganic salts, phthalic acid anhydride may also be employed as grinding assistant.

The grinding can be carried out for example in a ball, cylinder or vibratory mill or with mills which generate a strong shearing force. Grinding is usually carried out at room temperature. However, it may be advantageous to work at higher temperatures, in which case the heat is either supplied from outside or arises from the grinding procedure and is not drawn off or only partially drawn off. After grinding, the grinding assistants are removed, namely, the solvents by means of distillation, and the salts by washing them out with water or diluted mineral acid. The mixture must be complete, before the product is brought into contact with aromatic solvents; otherwise no stabilization is achieved.

The pigments according to the invention have a very soft texture and have a high heat stability and color strength and excellent stability in organic solvents. They are, therefore, very well suited for colouring various types of lacquers, natural resins, synthetic polymer resins and rubber and for dyeing viscose and cellulose esters, for example, in spin dyeing. In particular, compared with the stabilised α-form, when they are used for the colouring of lacquers, the shade is purer and of greater intensity and they are stabler to heat, when incorporated in poly-vinyl chloride resins material than the stabilized or un-stabilized α-form. Furthermore, they can be used for the production of printing inks for paper, textiles and plastics.

Further details of the invention can be seen from the following non-limitative examples wherein the temperatures are given in degrees centigrade.

*Example 1*

1.5 grams (g.) of chlorinated copper phthalocyanine (chlorine content 4.1% and 13.5 g. of metal-free phthalocyanine are ground for about 90 minutes together with 45 g. of anhydrous calcium chloride and 2 g. of diethylaniline in a 1-liter vibratory mill ("Vibratom" manufactured by Siebtechnik, Mühlheim-Ruhr, Germany), which is equipped with a number of balls each of 15 mm. in diameter and which have together a total weight of 3.6 kgs. The grounded material is heated whilst being stirred for 1 hour to 80° in 400 g. water and 5 g. concentrated hydrochloric acid, the suspension is filtered off, the residue is washed to neutral and salt-free, and the pigment is dried in vacuum at 60°. A greenish-blue soft powder is produced, which, in printing inks, has a shade which is very similar to that of the pure microcrystalline but unstable β-form of the metal-free phthalocyanine; the pigment stabilized in this manner retains its shade and its colour strength even after being boiled in toluene for 1 hour.

Pigments, which are equally well stabilized, are obtained when using 1.5 g. of chlorinated cobalt phthalocyanine (chlorine content 3.1%) or chlorinated nickel phthalocyanine (chlorine content 4.8%) instead of the chlorinated copper phthalocyanine, used in the above example, and/or by using 2 g. of xylene or quinoline or o-dichlorobenzene instead of the diethlyaniline used in the example as grinding medium.

A marked degree of stabilization towards toluene is obtained even if 0.6 g. of the above described chlorinated copper phthalocyanine is ground with 14.4 g. metal-free phthalocyanine under the same conditions indicated in Example 1.

*Example 2*

5.5 g. of chlorinated copper phthalocyanine (chlorine content 4%) and 9.5 g. of metal-free phthalocyanine are ground and after-treated in the same manner as in Example 1 with 45 g. anhydrous calcium chloride and 2 g. diethylaniline. A pigment which is stable in aromatic solvents and is of the same shade as a finely crystalline metal-free phthalocyanine of the α-form is obtained.

*Example 3*

20 g. microcrystalline chlorinated copper phthalocyanine (chlorine content 3.5%) which is converted into pigment form by means of repricipitation from concentrated sulphuric acid or by means of grinding with salts in the presence of diethylaniline, is intimately mixed by shaking with 80 g. of microcrystalline metal-free phthalocyanine of the β-form, which has been produced in accordance with a conventional method by grinding with salts and xylene. The resulting mixture formed shows hardly any loss of shade and color strength even after being boiled in toluene for 1 hour, and can therefore be used in lacquers and printing inks containing aromatic solvents such as toluene or xylene.

*Example 4*

0.75 g. of brominated copper phthalocyanine (bromine content 12%), 0.75 g. of copper phthalocyanine and 13.5 g. of metal-free phthalocyanine are ground and after-treated under the same conditions as described in Example 1 with 40 g. of anhydrous sodium sulphate and 3 g. of anhydrous sodium acetate in the presence of 2 g. of xylene. The isolated pigment is greenish-blue and even after being boiled in toluene for 1 hour does not lose its shade and colour strength.

The above-mentioned monobromo copper phthalocyanine is produced by heating 1 mol of 3-bromophthalic acid anhydride, 3 mols of phthalic acid anhydride, 16 mols of urea, 1.3 mols of copper-II-chloride and 0.001 mol of ammonium molybdate in 20 mols of nitrobenzene for 6 hours at 170–175°. After filtering, the residue is washed with ethanol and acetone and purified by boiling out first with 2 N sodium hydroxide solution and then with 2 N hydrochloric acid.

Example 5

One g. of 4,4′,4″,4‴-tetrafluorocopper phthalocyanine (produced from 4-fluorophthalic acid anhydride), 1 g. of copper phthalocyanine and 13 g. of metal-free phthalocyanine are ground and aftertreated under the same conditions as in Example 1 with 45 g. of anhydrous calcium chloride and 2 g. of diethylaniline. The isolated pigment is greenish-blue and is stable in lacquers containing aromatic solvents such as toluene and xylene.

The above mentioned 4,4′,4″,4‴-tetrafluoro copper phthalocyanine is produced by heating 1 mol of 4-fluorophthalic acid anhydride, (M.P. 66–68°), 1 mol of ammonium nitrate, 4 mols of urea, 0.3 mol of copper-II-chloride and 0.001 mol of ammonium molybdate in 10 mols of nitrobenzene for 8 hours at 160–170°. After filtering off from the nitrobenzene, the residue is washed with ethanol and acetone and purified by boiling out in 2 N sodium hydroxide solution and then in 2 N hydrochloric acid.

Example 6

3 g. of asymmetrical tetrachlorocopper phthalocyanine (produced from 1 mol tetrachlorophthalic acid anhydride, 3 mols phthalic acid anhydride) and 12 g. metal-free phthalocyanine are ground and aftertreated under the same conditions as in Example 1 with 45 g. anhydrous calcium chloride and 2 g. of a petroleum fraction of B.P. 180–220°. The isolated pigment is blue-green and is stable in lacquers containing xylene.

A redder pigment of equally good stability in xylene is obtained when 7.5 g. of 4,4′,4″,4‴-tetrachlorocopper phthalocyanine produced from 4 mols of 4-chlorophthalic acid anhydride by known methods and 7.5 g. of metal-free phthalocyanine are ground under the same conditions.

The above-mentioned asymmetrical tetrachloro copper phthalocyanine is produced by heating 1 mol of tetrachlorophthalic acid anhydride, 3 mols of phthalic acid anhydride, 5 mols of urea, 1.3 mols of copper-II-chloride and 0.002 mol of ammonium molybdate in 20 mols of nitrobenzene for 10 hours at 170°. After filtering, the residue is washed with ethanol and acetone and purified by boiling out in 2 N sodium hydroxide solution and then in 2 N hydrochloric acid.

Example 7

1 g. of the pigment produced in accordance with Example 1 and 5 g. of titanium dioxide are added to 100 g. of a stoving lacquer which consists of 58.5 g. of a 60% solution of a coconut oil fatty acid modified alkyd resin in xylene and 23 g. of a 65% solution of melamine varnishing resin in butanol and is diluted with an additional 17 g. xylene and 1.5 g. of butanol. The mixture is ground in a ball mill for 48 hours and the lacquer pigmented in this manner is sprayed on to a cleaned metal surface. After burning-in at 120° for 1 hour, a pure, greenish-blue coloration which has good color strength and good fastness to light and overpainting is obtained.

Example 8

10 g. of the pigment produced in accordance with Example 2 are ground in a ball mill for 24 hours with 30 g. cyclized rubber (Alpex 450 J) and 60 g. of toluene. A printing ink is obtained, which in gravure printing yields greenish-blue prints of hgh purty and color strength and of excellent fastness to lght.

Example 9

67 g. of polyvinylchloride powder (suspension polymerisate), 33 g. of dioctylphthalate, 2 g. of dibutyl tin dilaurate, 0.3 g. of a stabilizer with a phosphate base and 0.5 g. of the pigment produced in accordance with Example 6 are mixed and processed for 15 minutes on a set of mixing rollers operating at 160°. A film of 0.4 mm. thickness is subsequently produced on the calender. It is coloured to a pure greenish-blue shade. The coloration is heat resistant and fast to migration.

Example 10

1 g. of chlorinated copper phthalocyanine (chlorine content 4.1%), 0.5 g. of brominated copper phthalocyanine (bromine content 12%), prepared as described at the end of Example 4, 0.5 g. of copper phthalocyanine and 13.5 g. of metal-free phthalocyanine are ground and aftertreated under the same conditions as described in Example 1 with 45 g. of anhydrous calcium chloride in the presence of 2 g. of quinoline. The isolated pigment is greenish-blue and stable in lacquers which contain toluene and xylene.

What is claimed is:

1. A microcrystalline composition stable to aromatic solvents which consists essentially of
   (a) microcrystalline metal-free phthalocyanine in the β-form, and
   (b) as stabilizing agent, 10 to 45% of a partially halogenated metal-phthalocyanine of the α-form, the halogen of which has an atomic number ranging from 9 to 35 and the metal of which has an atomic number ranging from 27 to 29 inclusive, said stabilizing agent being present in such amounts that at least 0.08% by weight of the total composition consists of halogen; and at least about 2% by weight of said stabilizing agent consists of halogen.

2. A microcrystalline composition stable to aromatic solvents as defined in claim 1, wherein said stabilizing agent s a mixture of monochloro-copper-phthalocyanne and unhalogenated phthalocyanine.

3. A microcrystalline composition stable to aromatic solvents as defined in claim 1, wherein said stabilizing agent has a chlorine content of from about 3 to 5% by weight, calculated on the total weight of the stabilizing agent.

4. A microcrystalline composition as defined in claim 1, wherein the stabilizing agent amounts to at least about 8% by weight of the total weight of said composition.

5. A microcrystalline composition as defined in claim 1, wherein the stabilizing agent amounts to 8 to 15% by weight of the total weight of the composition.

6. A microcrystalline composition as defined in claim 1, wherein the stabilizing agent amounts to about 30 to 45% by weight of the total weight of the composition.

7. A microcrystalline composition as defined in claim 1, wherein the stabilizing agent is a partly halogenated copper phthalocyanine having a chlorine content of about 3 to 5% by weight, calculated on the weight of the stabilizing agent, and wherein the stabilizing agent is present in an amount of about 10% by weight, calculated on the total weight of the composition.

References Cited by the Examiner

UNITED STATES PATENTS 2,826,589   3/1958   Muehlbauer et al. ____ 106—288

WALTER A. MODANCE, *Primary Examiner.*

TOBIAS E. LEVOW, J. POER, J. A. PATTEN,
*Assistant Examiners.*